United States Patent
Ramachandran et al.

(10) Patent No.: US 10,270,846 B2
(45) Date of Patent: Apr. 23, 2019

(54) SYSTEM AND METHOD FOR MONITORING A SERVICE-ORIENTED ARCHITECTURE IN A LOAD-BALANCED ENVIRONMENT

(71) Applicant: Dell Products L.P., Round Rock, TX (US)

(72) Inventors: Venkat S. Ramachandran, Round Rock, TX (US); Chakradhar Kommana, Cedar Park, TX (US); Pravash Ranjan Panda, Rourkela (IN); Hung Dinh, Austin, TX (US); Kamalakar Reddy Ponaka, Bangalore (IN); Rajesh Krishnan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 256 days.

(21) Appl. No.: 15/234,952

(22) Filed: Aug. 11, 2016

(65) Prior Publication Data
US 2018/0048538 A1    Feb. 15, 2018

(51) Int. Cl.
*G06F 15/173* (2006.01)
*H04L 29/08* (2006.01)
*H04L 29/12* (2006.01)
*G06F 15/16* (2006.01)

(52) U.S. Cl.
CPC ...... *H04L 67/1002* (2013.01); *H04L 61/2503* (2013.01); *H04L 61/2521* (2013.01)

(58) Field of Classification Search
CPC . H04L 41/5051; H04L 41/22; H04L 61/2503; H04L 67/1002
USPC ........................................................ 709/224
See application file for complete search history.

(56) References Cited

U.S. PATENT DOCUMENTS

| 6,901,582 | B1 | 5/2005 | Harrison | |
|---|---|---|---|---|
| 7,974,939 | B2 * | 7/2011 | Nanjangud Bhaskar | G06F 8/10 707/608 |
| 8,024,397 | B1 * | 9/2011 | Erickson | G06F 9/5055 707/602 |
| 8,041,760 | B2 | 10/2011 | Mamou et al. | |

(Continued)

OTHER PUBLICATIONS

Oracle; "WebLogic Server Management Pack Enterprise Edition"; http://www.oracle.com/technetwork/oem/soa-mgmt/ds-em12c-wls-mgmt-pack-ee-1552456.pdf; Dec. 13, 2015; 5 pages.

(Continued)

*Primary Examiner* — Melvin H Pollack
(74) *Attorney, Agent, or Firm* — Winstead PC

(57) ABSTRACT

In an embodiment, a method includes identifying a particular service of a service-oriented architecture. The method also includes querying a data store for callers of the particular service, where the querying yields load-balancing internet protocol (IP) addresses of the callers in relation to proportional numbers of calls to the particular service. The method also includes resolving the load-balancing IP addresses to host IP addresses of the callers of the particular service. The method also includes resolving the host IP addresses to host names of particular hosts. The method also includes identifying applications of the particular hosts via the host names. The method also includes generating a data object including the host names, identifiers of the applications, and information related to the proportional numbers of calls to the particular service.

20 Claims, 7 Drawing Sheets

(56) References Cited

U.S. PATENT DOCUMENTS

| | | | |
|---|---|---|---|
| 8,131,838 B2* | 3/2012 | Bornhoevd | G06F 9/54 709/217 |
| 8,140,677 B2* | 3/2012 | Chalasani | H04L 67/1095 709/221 |
| 8,175,863 B1 | 5/2012 | Ostermeyer et al. | |
| 8,180,849 B2* | 5/2012 | Viegener | H04L 67/28 709/217 |
| 8,239,520 B2* | 8/2012 | Grah | H04L 67/02 709/223 |
| 8,510,601 B1* | 8/2013 | Desai | G06F 11/263 714/27 |
| 8,631,154 B2* | 1/2014 | Bartfai-Walcott | H04L 47/2433 709/224 |
| 8,793,363 B2* | 7/2014 | Sater | H04L 67/36 709/223 |
| 9,215,142 B1 | 12/2015 | Herold et al. | |
| 9,559,928 B1* | 1/2017 | Porter | G06F 11/3612 |
| 9,686,150 B2* | 6/2017 | Gesmann | H04L 41/5009 |
| 9,886,296 B2* | 2/2018 | Clark | G06F 9/45558 |
| 2010/0296402 A1* | 11/2010 | Fraccalvieri | H04L 47/10 370/252 |
| 2011/0276951 A1* | 11/2011 | Jain | G06F 11/3006 717/140 |
| 2012/0066487 A1* | 3/2012 | Brown | G06F 9/5083 713/150 |
| 2013/0346367 A1* | 12/2013 | Trugman | G06Q 10/10 707/613 |
| 2014/0075019 A1* | 3/2014 | Mordani | H04L 41/5058 709/224 |
| 2014/0136689 A1* | 5/2014 | Beaty | H04L 67/1097 709/224 |
| 2014/0201362 A1* | 7/2014 | Radhakrishnan | G06F 9/5061 709/224 |
| 2015/0341428 A1* | 11/2015 | Chauhan | H04L 69/16 709/203 |
| 2016/0173641 A1* | 6/2016 | Broussard | H04L 47/823 709/224 |
| 2016/0182324 A1* | 6/2016 | Harishankar | H04L 43/062 709/224 |
| 2016/0196324 A1* | 7/2016 | Haviv | G06F 17/30598 707/626 |
| 2016/0353268 A1* | 12/2016 | Senarath | H04W 4/24 |
| 2017/0085436 A1* | 3/2017 | Costa | H04L 41/22 |
| 2017/0111241 A1* | 4/2017 | Degioanni | H04L 41/5058 |
| 2017/0149615 A1* | 5/2017 | He | H04L 41/5009 |
| 2017/0213005 A1* | 7/2017 | Cox | G06F 19/3418 |
| 2017/0272349 A1* | 9/2017 | Hopkins | H04L 43/04 |

OTHER PUBLICATIONS

Salchow, KJ; "Load Balancing 101: Nuts and Bolts"; https://f5.com/resources/white-papers/load-balancing-101-nuts-and-bolts; Apr. 23, 2012; 9 pages.

\* cited by examiner

List of all Endpoint Customers for Service URL SODSDataService/1_0_0/ProxyServices/SODSHistoricalOrderSearchPS Click Icon to Download in Excel

| Host IP Address | Host Name | Application Name | Call Count |
|---|---|---|---|
| 10.143.250.232 | bldr-trans-snat | | 789304 |
| 10.143.5.132 | auspwbilprod09<br>auspwbilprod11 | BUSINESS INTEGRATION LAYER<br>BUSINESS INTEGRATION LAYER<br>Configuration BIL | 271060 |
| 10.143.5.128 | auspwbilprod09<br>auspwbilprod11 | BUSINESS INTEGRATION LAYER<br>BUSINESS INTEGRATION LAYER<br>Configuration BIL | 265975 |
| 10.143.5.133 | auspwbilprod09<br>auspwbilprod11 | BUSINESS INTEGRATION LAYER<br>BUSINESS INTEGRATION LAYER<br>Configuration BIL | 258005 |
| 10.143.5.124 | auspwbilprod05<br>auspwbilprod07 | BUSINESS INTEGRATION LAYER<br>BUSINESS INTEGRATION LAYER | 236600 |
| 10.143.5.138 | ausso?????<br>ausso?????01<br>ausso?????02<br>ausso?????02<br>ausso?????03 | Oracle BPEL<br>Oracle Service Bus<br>Oracle Service Bus<br>Oracle Service Bus<br>Oracle Service Bus | 72822 |
| 10.143.5.188 | ausso?????<br>ausso?????01<br>ausso?????02<br>ausso?????02<br>ausso?????03 | Oracle BPEL<br>Oracle Service Bus<br>Oracle Service Bus<br>Oracle Service Bus<br>Oracle Service Bus | 52519 |
| 10.177.4.65 | u2vmmssdrapp1 | MSS/MSS2 - ARB | 52473 |
| 10.178.4.63 | u1vmmssprdapp1 | MSS/MSS2 - ARB | 51361 |
| 10.178.52.87 | u1ummssordapp2 | MSS/MSS2 - ARB | 48283 |

FIG. 7

SYSTEM AND METHOD FOR MONITORING A SERVICE-ORIENTED ARCHITECTURE IN A LOAD-BALANCED ENVIRONMENT

BACKGROUND

Technical Field

The present disclosure relates generally to resource utilization and more particularly, but not by way of limitation, to systems and methods for monitoring a service-oriented architecture in a load-balanced environment.

History of Related Art

Services in the service-oriented architecture (SOA) world are often deployed, for example, on thousands of servers and handle millions of transactions per day. Providing a holistic view into the health and performance of SOAs is technically difficult due to the sheer number and diversity of applications calling SOA services, the overall number of transactions, and other factors.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. In one general aspect, a method is performed by a computer system and includes identifying a particular service of a service-oriented architecture, where the identifying yields an identifier of the particular service. The method also includes via the identifier, querying a data store for callers of the particular service, where the querying yields load-balancing internet protocol (IP) addresses of the callers in relation to proportional numbers of calls to the particular service. The method also includes resolving the load-balancing IP addresses to host IP addresses of the callers of the particular service. The method also includes resolving the host IP addresses to host names of particular hosts. The method also includes identifying applications of the particular hosts via the host names. The method also includes generating a data object including the host names, identifiers of the applications, and information related to the proportional numbers of calls to the particular service. Other embodiments of this aspect include corresponding computer systems, apparatus, and computer programs recorded on one or more computer storage devices, each configured to perform the actions of the methods.

In another general aspect, an information handling system includes a processor and memory that in combination are operable to perform a method. The method includes identifying a particular service of a service-oriented architecture, where the identifying yields an identifier of the particular service. The method also includes via the identifier, querying a data store for callers of the particular service, where the querying yields load-balancing internet protocol (IP) addresses of the callers in relation to proportional numbers of calls to the particular service. The method also includes resolving the load-balancing IP addresses to host IP addresses of the callers of the particular service. The method also includes resolving the host IP addresses to host names of particular hosts. The method also includes identifying applications of the particular hosts via the host names. The method also includes generating a data object including the host names, identifiers of the applications, and information related to the proportional numbers of calls to the particular service. Other embodiments of this aspect include corresponding computer systems, apparatus, and computer programs recorded on one or more computer storage devices, each configured to perform the actions of the methods.

In another general aspect, a computer-program product includes a non-transitory computer-usable medium having computer-readable program code embodied therein. The computer-readable program code is adapted to be executed to implement a method. The method includes identifying a particular service of a service-oriented architecture, where the identifying yields an identifier of the particular service. The method also includes via the identifier, querying a data store for callers of the particular service, where the querying yields load-balancing internet protocol (IP) addresses of the callers in relation to proportional numbers of calls to the particular service. The method also includes resolving the load-balancing IP addresses to host IP addresses of the callers of the particular service. The method also includes resolving the host IP addresses to host names of particular hosts. The method also includes identifying applications of the particular hosts via the host names. The method also includes generating a data object including the host names, identifiers of the applications, and information related to the proportional numbers of calls to the particular service. Other embodiments of this aspect include corresponding computer systems, apparatus, and computer programs recorded on one or more computer storage devices, each configured to perform the actions of the methods.

BRIEF DESCRIPTION OF THE DRAWINGS

A more complete understanding of the method and apparatus of the present disclosure may be obtained by reference to the following Detailed Description when taken in conjunction with the accompanying Drawings wherein:

FIGS. 5-7 illustrate example dashboards.

DETAILED DESCRIPTION

In various embodiments, a caller of a service can be a computer system, a combination of interconnected computer systems, an application on a computer system, etc. A service can be a self-contained unit of functionality that can be discretely invoked. When monitoring service utilization, in some embodiments, it can be useful to identify service utilization by callers of the services, for example, in terms of transaction or call count and other metrics. A technical problem associated with service monitoring is that callers of services are often load-balanced, so that a network address provided to a called service does not precisely identify, for example, hosts and applications responsible for originating the call.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
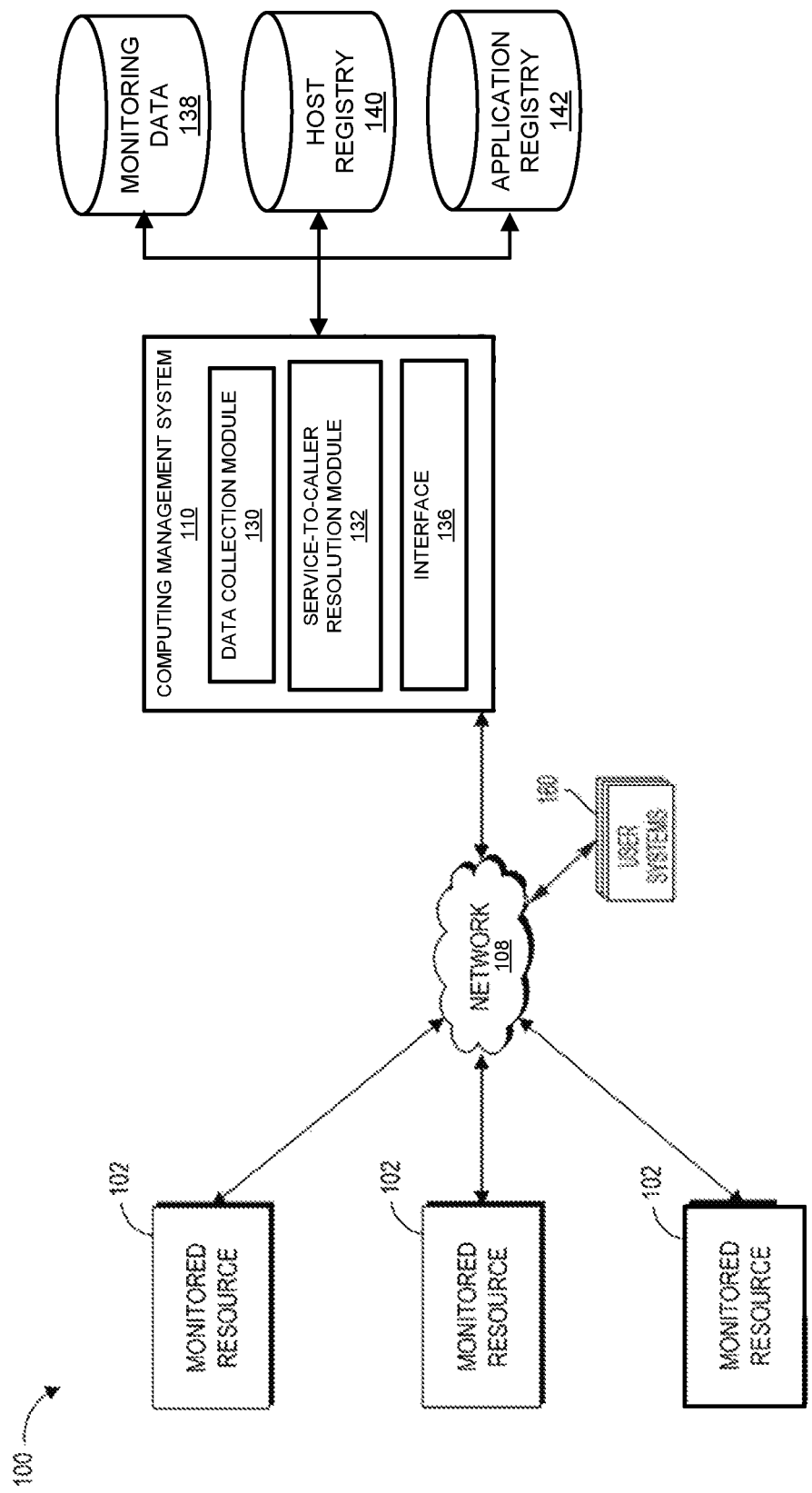
FIG. 1 illustrates an example computing environment.

FIG. 1 illustrates an example computing environment 100 for implementing an embodiment of a computing management system 110. The computing environment 100 includes the computing management system 110, resources 102, user systems 160, and data stores 138, 140 and 142, each of which is operable to communicate over a network 108. The network 108 may be a private network, a public network, a local or wide area network, a portion of the Internet, combinations of the same, and/or the like.

The computing management system 110 can manage and/or monitor the resources 102 for performance tuning reasons, troubleshooting, or other reasons. The managed resources 102 may, for instance, include devices in a data center or in a plurality of data centers. Some examples of the managed resources 102 include the following: information handling systems, virtual machines, servers, web servers, application servers, databases, applications, enterprise service buses, process orchestration engines, processors, memories, hard drives or other storage devices, peripherals, software components, database tables, tablespaces in a database, application tiers, network switches and other network hardware, combinations of same, and/or the like. The managed resources 102 can be geographically separate or co-located. More particularly, in certain embodiments, the resources 102 can include services of a service-oriented architecture (SOA). In a typical embodiment, each of the services can be an arrangement of one or more of the resources 102 that are available to be called by others of the resources 102, for example, over the network 108.

In the depicted embodiment, the computing management system 110 includes a data collection module 130, a service-to-caller resolution module 132, and an interface 136. Each of these components can be implemented with hardware and/or software, including (optionally) virtual machines. In an example, the computing management system 110 can be implemented as a single management server. In another example, the computing management system 110 can be implemented in a plurality of virtual or physical servers, which may or may not be geographically co-located. For instance, the computing management system 110 and/or other aspects of the computing environment 100 may be hosted in a cloud-based hosting service such as the Azure™ service provided by Microsoft® or the EC2™ platform provided by Amazon®.

The data collection module 130 can be one or more software and/or hardware agents, appliances, or the like that collect monitoring data about the monitored resources 102. This monitoring data can include time-series data related to the performance of physical and/or software components (including virtual components), such as performance related to any of the monitored resources 102 described above. For example, the monitoring data can include information related to a number of transactions executed by services of the SOA. The monitoring data can also include information about attributes, characteristics, or properties of the monitored resources 102, such as the number of processors in each host device, memory or storage capacity, hardware or software specifications, virtual machine characteristics, and so forth. The data collection module 130 can collect this monitoring data in real-time, periodically, e.g., according to a schedule, on-demand, or a combination of the same, and store the monitoring data in the data store 138. Furthermore, in certain embodiments, some or all of the resources 102 can be mapped to lines of business (LOBs) within a given organization. In that way, in certain embodiments, the monitoring data of the data store 138 can be segmented into meaningful business groupings.

In some embodiments, the data collection module 130 can access this data remotely by querying libraries or APIs of the monitored resources 102. In addition, or alternatively, the data collection module 130 can use a plurality of protocols so as to request the monitoring data according to particular protocols supported by the resources 102. For example, in various cases, the data collection module 130 can request and obtain at least a portion of the monitoring data using, for example, Representational State Transfer (REST), Simple Object Access Protocol (SOAP), Transport Control Protocol and Internet Protocol (TCP/IP), hypertext transfer protocol (HTTP), file system, File Transfer Protocol (FTP), Simple Mail Transfer Protocol (SMTP), JAVA Management Extensions (JMX), Remote Method Invocation (RMI), Java Database Connectivity (JDBC), Open Database Connectivity (ODBC), bulk transfer protocols such as Extract, Transform and Load (ETL) protocols, combinations of same and/or the like. In various cases, the monitoring data can be obtained in various message formats such as Extensible Markup Language (XML), financial message formats such as Society for Worldwide Interbank Financial Telecommunication (SWIFT) format, electronic data interchange (EDI) formats, Health Level-7(HL7) format, combinations of same and/or the like. In certain embodiments, the data collection 130 can convert between various protocols, used by heterogeneous systems (such as the resources 102), to one or more standard protocols. The protocols that are deemed standard can be configurable to suit particular implementations.

The service-to-caller resolution module 132 is operable to initiate resolution of a service call to a particular caller of the service. More particular example operation of the service-to-caller resolution module will be described in relation to FIGS. 3-7. In certain embodiments, the interface 136 can provide information generated by the service-to-caller resolution module 132 and/or the data collection module 130. For example, the interface 136 can publish reports or other generated information to a web page, dashboard, and/or the like. Additionally, or alternatively, the interface 136 can publish the above-described information, or similar information, to files, databases, user datagram protocol (UDP) endpoints, combinations of same and/or the like. In various cases, the interface 136 can trigger, for example, the data collection module 130 and/or the service-to-caller resolution module 132 for purposes of generating requested or required data. In some embodiments, the interface 136 can conform to certain constraints of (REST) and thus be considered a RESTful interface.

The web page, user dashboard or other user interface(s) output, for example, by the interface 136, can be accessed by the user systems 160. The interface 136 can also provide a user interface, for instance, that allows the users of the user systems 160 to provide configuration updates, request particular information, etc. The user systems 160 can include any type of computing device, including information handling systems such as desktops, laptops, tablets, smartphones, PDAs, to name a few.

Figure 2:
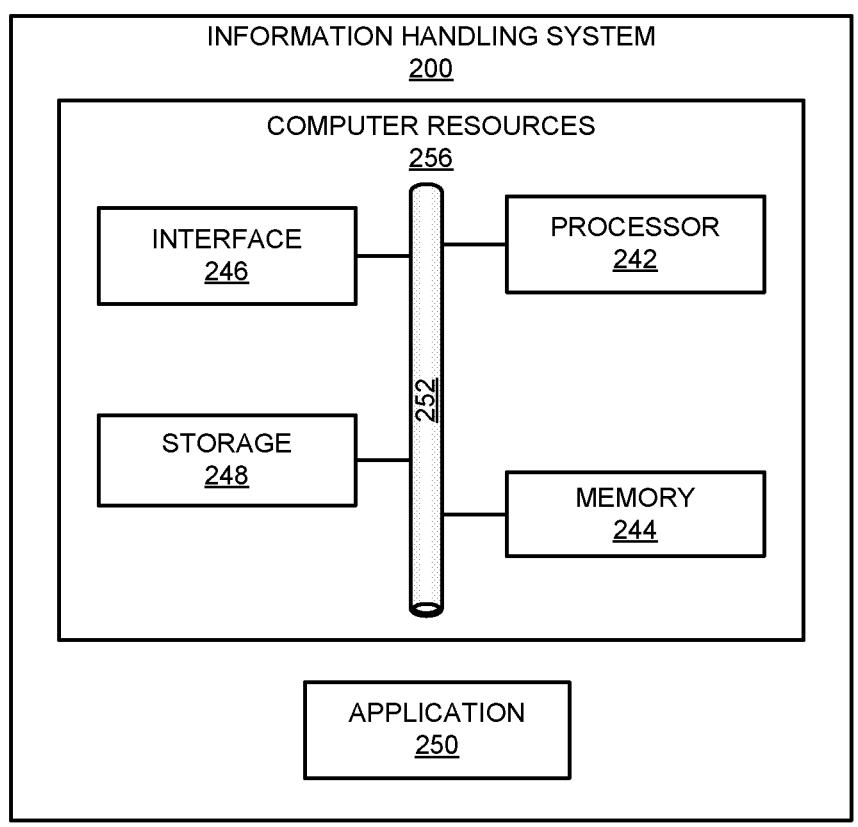
FIG. 2 illustrates an example of an information handling system.

FIG. 2 illustrates an example of an information handling system 200 that, in some cases, can be representative, for example, of the resources 102, the computing management system 110 and/or the user systems 160. The information handling system 200 includes an application 250 operable to execute on computer resources 256. The application 250 can be similar, for example, to data collection module 130, the service-to-caller resolution module 132 and, in some cases, the interface 136. In particular embodiments, the information handling system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the information handling system 200 may comprise any suitable physical form, configuration, number, type and/or layout. As an example, and not by way of limitation, the information handling system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the information handling system 200 may include one or more computer systems; be unitary or distributed; span multiple locations; span multiple machines; or reside in a cloud, which may include one or more cloud components in one or more networks.

In the depicted embodiment, the information handling system 200 includes a processor 242, memory 244, storage 248, interface 246, and bus 252. Although a particular information handling system is depicted having a particular number of particular components in a particular arrangement, this disclosure contemplates any suitable information handling system having any suitable number of any suitable components in any suitable arrangement.

Processor 242 may be a microprocessor, controller, or any other suitable computing device, resource, or combination of hardware, software and/or encoded logic operable to execute, either alone or in conjunction with other components, (e.g., memory 244), the application 250. Such functionality may include providing various features discussed herein. In particular embodiments, processor 242 may include hardware for executing instructions, such as those making up the application 250. As an example and not by way of limitation, to execute instructions, processor 242 may retrieve (or fetch) instructions from an internal register, an internal cache, memory 244, or storage 248; decode and execute them; and then write one or more results to an internal register, an internal cache, memory 244, or storage 248.

In particular embodiments, processor 242 may include one or more internal caches for data, instructions, or addresses. This disclosure contemplates processor 242 including any suitable number of any suitable internal caches, where appropriate. As an example and not by way of limitation, processor 242 may include one or more instruction caches, one or more data caches, and one or more translation lookaside buffers (TLBs). Instructions in the instruction caches may be copies of instructions in memory 244 or storage 248 and the instruction caches may speed up retrieval of those instructions by processor 242. Data in the data caches may be copies of data in memory 244 or storage 248 for instructions executing at processor 242 to operate on; the results of previous instructions executed at processor 242 for access by subsequent instructions executing at processor 242, or for writing to memory 244, or storage 248; or other suitable data. The data caches may speed up read or write operations by processor 242. The TLBs may speed up virtual-address translations for processor 242. In particular embodiments, processor 242 may include one or more internal registers for data, instructions, or addresses. Depending on the embodiment, processor 242 may include any suitable number of any suitable internal registers, where appropriate. Where appropriate, processor 242 may include one or more arithmetic logic units (ALUs); be a multi-core processor; include one or more processors 242; or any other suitable processor.

Memory 244 may be any form of volatile or non-volatile memory including, without limitation, magnetic media, optical media, random access memory (RAM), read-only memory (ROM), flash memory, removable media, or any other suitable local or remote memory component or components. In particular embodiments, memory 244 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 244 may include one or more memories 244, where appropriate. Memory 244 may store any suitable data or information utilized by the information handling system 200, including software embedded in a computer readable medium, and/or encoded logic incorporated in hardware or otherwise stored (e.g., firmware). In particular embodiments, memory 244 may include main memory for storing instructions for processor 242 to execute or data for processor 242 to operate on. In particular embodiments, one or more memory management units (MMUs) may reside between processor 242 and memory 244 and facilitate accesses to memory 244 requested by processor 242.

As an example and not by way of limitation, the information handling system 200 may load instructions from storage 248 or another source (such as, for example, another computer system) to memory 244. Processor 242 may then load the instructions from memory 244 to an internal register or internal cache. To execute the instructions, processor 242 may retrieve the instructions from the internal register or internal cache and decode them. During or after execution of the instructions, processor 242 may write one or more results (which may be intermediate or final results) to the internal register or internal cache. Processor 242 may then write one or more of those results to memory 244. In particular embodiments, processor 242 may execute only instructions in one or more internal registers or internal caches or in memory 244 (as opposed to storage 248 or elsewhere) and may operate only on data in one or more internal registers or internal caches or in memory 244 (as opposed to storage 248 or elsewhere).

In particular embodiments, storage 248 may include mass storage for data or instructions. As an example and not by way of limitation, storage 248 may include a hard disk drive (HDD), a floppy disk drive, flash memory, an optical disc, a magneto-optical disc, magnetic tape, or a Universal Serial Bus (USB) drive or a combination of two or more of these. Storage 248 may include removable or non-removable (or fixed) media, where appropriate. Storage 248 may be internal or external to the information handling system 200, where appropriate. In particular embodiments, storage 248 may be non-volatile, solid-state memory. In particular embodiments, storage 248 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 248 may take any suitable physical form and may comprise any suitable number or type of storage. Storage 248 may include one or more storage control units facilitating communication between processor 242 and storage 248, where appropriate.

In particular embodiments, interface 246 may include hardware, encoded software, or both providing one or more interfaces for communication (such as, for example, packet-based communication) among any networks, any network devices, and/or any other computer systems. As an example and not by way of limitation, communication interface 246 may include a network interface controller (NIC) or network adapter for communicating with an Ethernet or other wire-based network and/or a wireless NIC (WNIC) or wireless adapter for communicating with a wireless network.

Depending on the embodiment, interface 246 may be any type of interface suitable for any type of network for which information handling system 200 is used. As an example and not by way of limitation, information handling system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The information handling system 200 may include any suitable interface 246 for any one or more of these networks, where appropriate.

In some embodiments, interface 246 may include one or more interfaces for one or more I/O devices. One or more of these I/O devices may enable communication between a person and the information handling system 200. As an example and not by way of limitation, an I/O device may include a keyboard, keypad, microphone, monitor, mouse, printer, scanner, speaker, still camera, stylus, tablet, touch-screen, trackball, video camera, another suitable I/O device or a combination of two or more of these. An I/O device may include one or more sensors. Particular embodiments may include any suitable type and/or number of I/O devices and any suitable type and/or number of interfaces 246 for them. Where appropriate, interface 246 may include one or more drivers enabling processor 242 to drive one or more of these I/O devices. Interface 246 may include one or more interfaces 246, where appropriate.

Bus 252 may include any combination of hardware, software embedded in a computer readable medium, and/or encoded logic incorporated in hardware or otherwise stored (e.g., firmware) to couple components of the information handling system 200 to each other. As an example and not by way of limitation, bus 252 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 252 may include any number, type, and/or configuration of buses 252, where appropriate. In particular embodiments, one or more buses 252 (which may each include an address bus and a data bus) may couple processor 242 to memory 244. Bus 252 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 242 (such as, for example, one or more internal registers or caches), one or more portions of memory 244, one or more portions of storage 248, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 3:
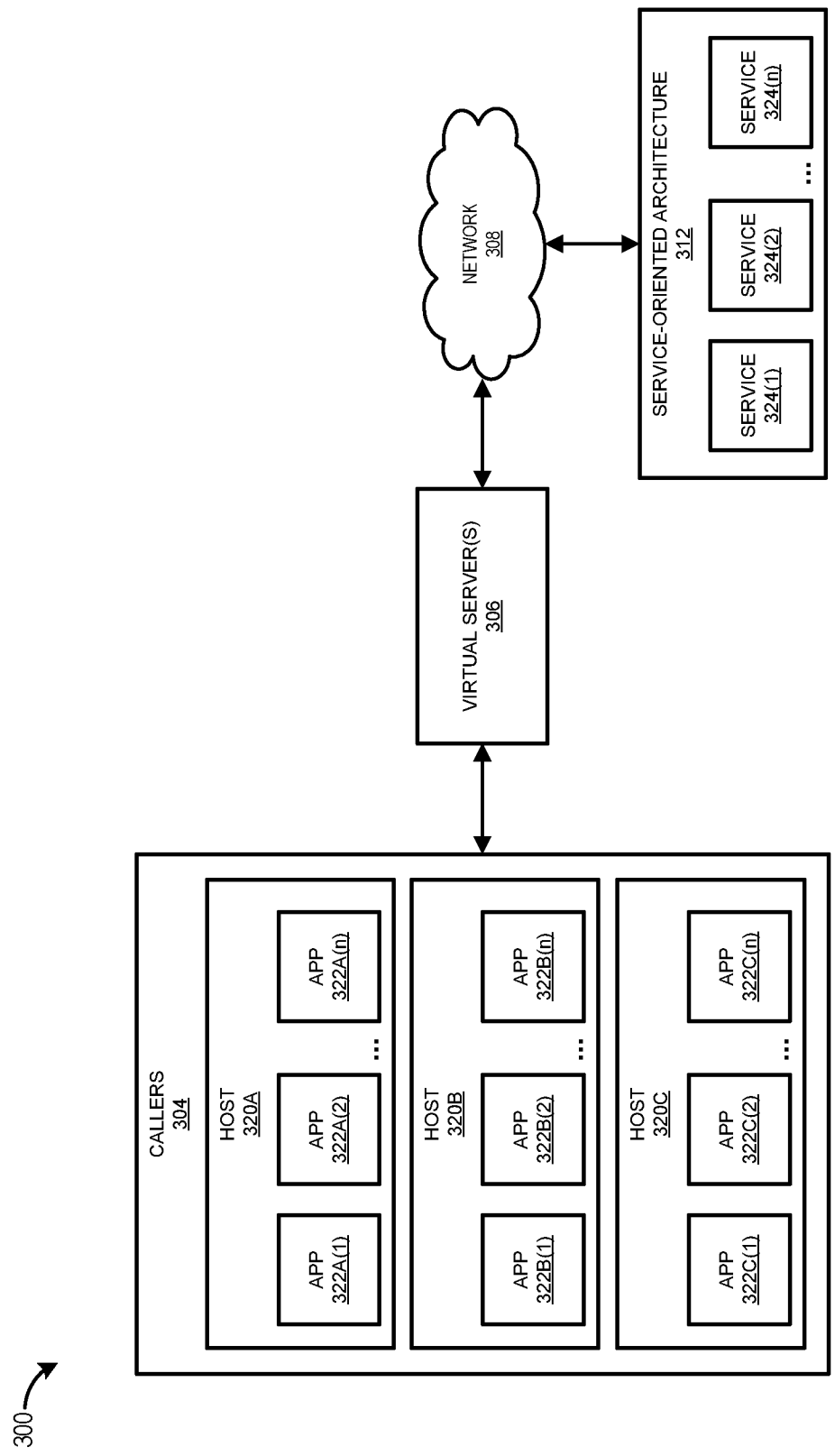
FIG. 3 illustrates an example arrangement of monitored resources.

FIG. 3 illustrates an example arrangement 300 of the resources 102 of FIG. 1. In particular, the arrangement 300 illustrates an example of service calls that can be monitored and tracked by the computing management system 110 of FIG. 1. As shown, services 324(1), 324(2) and 324(n) (collectively, services 324) of an SOA 312 are exposed over a network 308 and are available to be called by callers 304. The network 308 can operate, for example, as described in relation to the network 108 of FIG. 1.

In the illustrated embodiment, the callers 304 include hosts 320A, 320B and 320C (collectively, hosts 320). The hosts 320A, 320B and 320C are shown to include applications 322A(1), 322A(2) and 322A(n); 322B(1), 322B(2) and 322B(n); and 322C(1), 322C(2) and 322C(n), respectively. Periodically herein, the applications 322A(1)-(n), 322B(1)-(n) and 322C(1)-(n) may be referenced collectively as applications 322. In some cases, at least some of the applications 322 can be instances of a same software application or service.

As illustrated, the callers 304 can be subject to load balancing via one or more virtual server(s) 306. When any of the services 324 are called by any of the callers 304, the call is typically exposed to, and recorded by, the services 324 as originating from a load-balancing IP address associated with one of the virtual server(s) 306. The load-balancing IP address can conform to Internet Protocol Version 4 (Ipv4), Internet Protocol Version 6 (IPv6), etc. In addition, or alternatively, the load-balancing IP address can include a port number usable by the virtual server(s) to identify, for example, a particular host of the hosts 320 that originated a given call (e.g., 192.168.1.13:80, where 80 is a port number). In certain embodiments, as will be described in greater detail below, calls to the services 324 can be traced by the computing management system 110 to particular hosts of the host 320 and/or particular applications of the applications 322 even though the load-balancing IP address may not provide sufficient information.

It should be appreciated that the arrangement 300 is an illustration of inter-operation among the resources 102 of FIG. 1. For example, in many cases, the hosts 320, the applications 322, the virtual server(s) 306, and the services 324 can all be among the resources 102 of FIG. 1, such that each is discretely monitored by the computing management system 110 in the fashion described with respect to FIG. 1.

Figure 4:
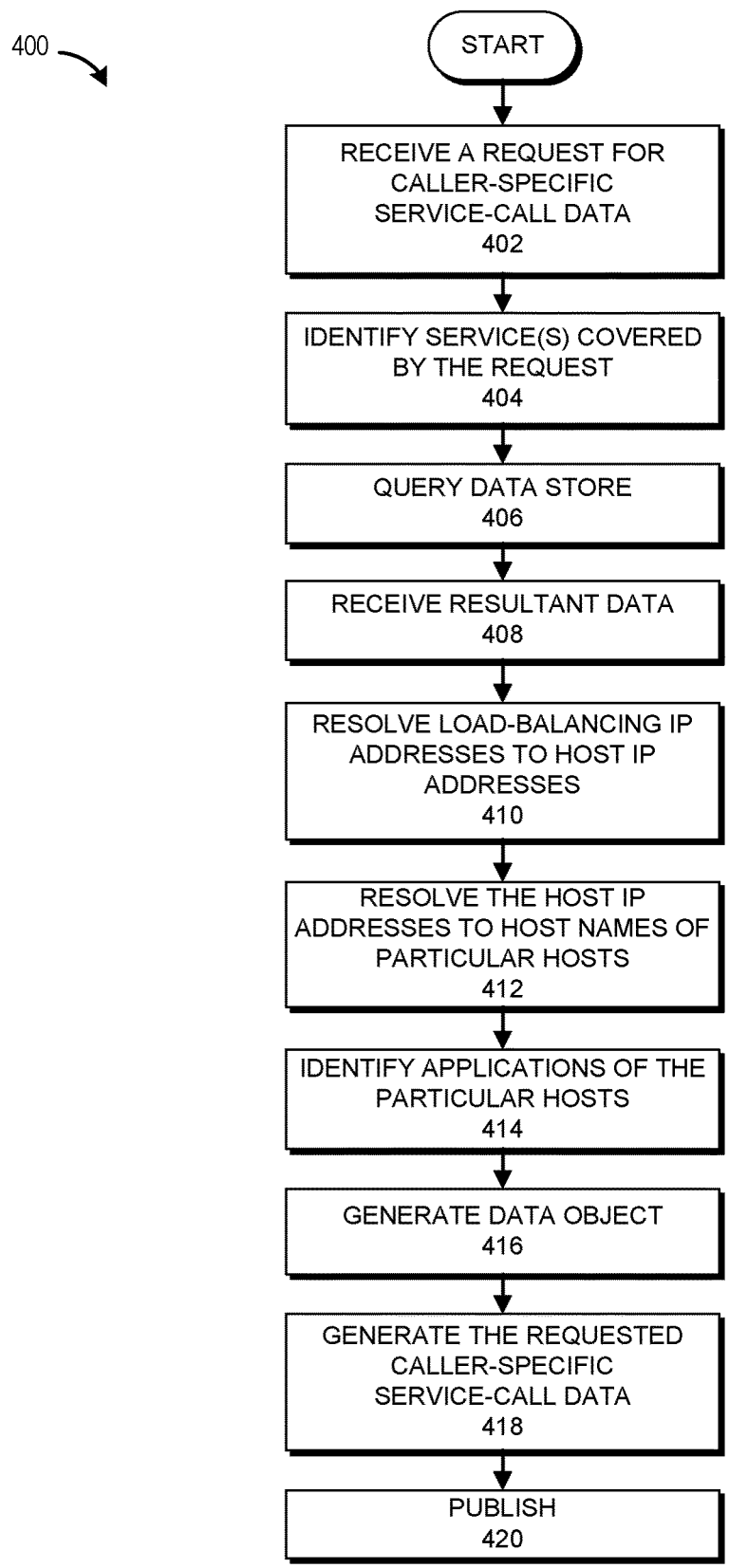
FIG. 4 illustrates an example of a process for generating and presenting caller-specific service-call data.

FIG. 4 illustrates an example of a process 400 for generating and presenting caller-specific service-call data. For example, the process 400, in whole or in part, can be implemented by one or more of the computing management system 110, the service-to-caller resolution module 132 and/or the interface 136. The process 400 can also be performed generally by the computing environment 100. Although any number of systems, in whole or in part, can implement the process 400, to simplify discussion, the process 400 will be described in relation to particular components of the computing management system 110.

At block 402, the interface 136 receives a request for caller-specific service-call data. In certain embodiments, the request indicates a scope of caller-specific service-call data. For example, the request can specify a particular group of services (e.g., by name, uniform resource locator (URL), or other identifier) or, more generally, the top-N most-called services (e.g., top ten, twenty, etc.), top-N least-called services, top-N failing services based on at least one performance criterion, combinations of same and/or the like. In addition, or alternatively, the request can specify constraints such as, for example, a particular time period for which service calls are of interest (e.g., the preceding thirty days, the preceding twelve hours, a particular day, week or month, etc.).

At block 404, the service-to-caller resolution module 132 identifies one or more services that are covered by the request. In some cases, the services can be directly specified in the request by name, uniform resource locator (URL), and/or other identifier. In other cases, such as when the request specifies one or more services in a generalized fashion (e.g., the top-N most-called services), the block 404 can include determining, for example, from the monitoring data of the data store 138, the specified services. For simplicity of description, blocks 406-416 will be described below in relation to a particular service (i.e., a single service). However, it should be appreciated that, if multiple services are identified at block 404 as being covered by the request received at block 402, the below-described functionality can be repeated and/or performed in parallel with respect to each such service.

At block 406, the service-to-caller resolution module 132 uses some or all of the information determined at block 404 to query the data store 138 for information about calls to the particular service. For example, the query can be constrained by the identifier of the service, the particular time period (if a time period is specified), and/or other constraints.

At block 408, the service-to-caller resolution module 132 receives resultant data from the query at block 406. The resultant data can include, for example, load-balancing IP addresses in relation to proportional numbers of calls originating from that load-balancing IP address. For example, the resultant data can identify a total number of calls attributed to each load-balancing IP address, a percentage or proportional number of a total number of calls attributed to each load-balancing IP address, combinations of same and/or the like. As described previously, the resultant data can be constrained, for example, by the particular time period, if any, from block 406 and/or be constrained by other constraints.

At block 410, the service-to-caller resolution module 132 resolves the load-balancing IP addresses yielded at block 408 to host IP addresses of the callers of the particular service (e.g., the callers 304 of FIG. 3). For example, with respect to FIG. 1, the block 410 can include looking up the load-balancing IP address in the data store 140 of FIG. 1 so as to determine the host IP addresses. As described previously, the data store 140 can map the load-balancing IP addresses (which can include ports as described above) to a particular host, for example, of the hosts 320 of FIG. 3.

At block 412, the service-to-caller resolution module 132 resolves the host IP addresses to host names of particular hosts. In certain embodiments, the block 412 can include, for example, performing a reverse domain name system (rDNS) lookup using the host IP addresses so as to determine the host names of the particular hosts.

At block 414, the service-to-caller resolution module 132 identifies applications of the particular hosts via the host names. For example, in certain embodiments, the block 414 can include looking up the host names in the data store 142 so as to yield identifiers of the applications on the corresponding hosts. The identifiers can include, for example, application names, numeric or alphanumeric identifiers, combinations of same and/or the like. At block 416, the service-to-caller resolution module 132 generates a data object comprising the host names, the identifiers of the applications, and information related to proportional numbers of calls to the particular service.

At block 418, interface 136 generates the requested caller-specific service-call data using the generated data object. At block 420, the interface 136 publishes the requested caller-specific service-call data for viewing, for example, on a user interface or dashboard.

Figure 5:
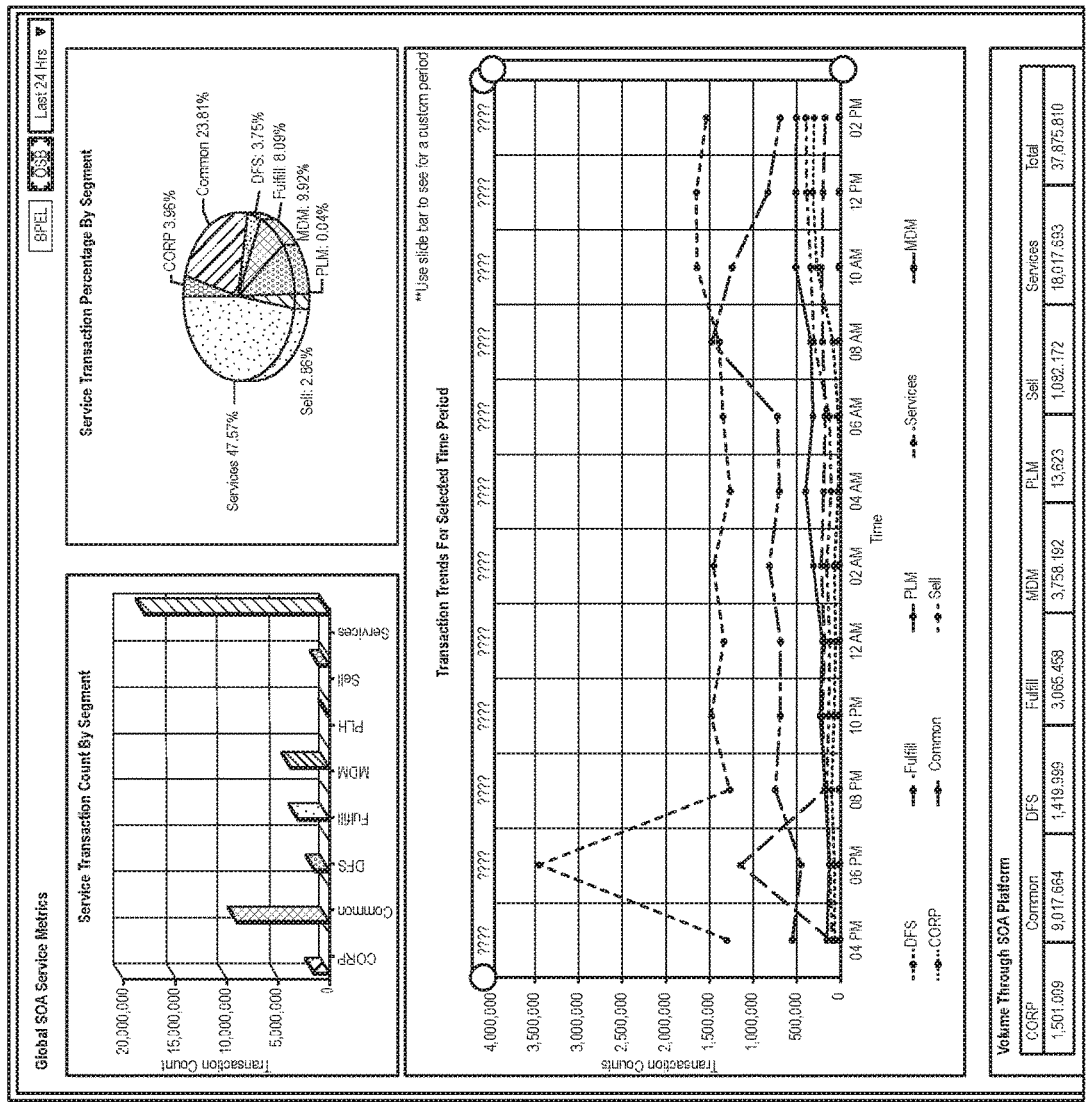

FIG. 5 illustrates an example dashboard 500. The dashboard 500 illustrates transaction counts, or number of calls, over a set of services (e.g., all services available to an organization) over a selected time period.

Figure 6:
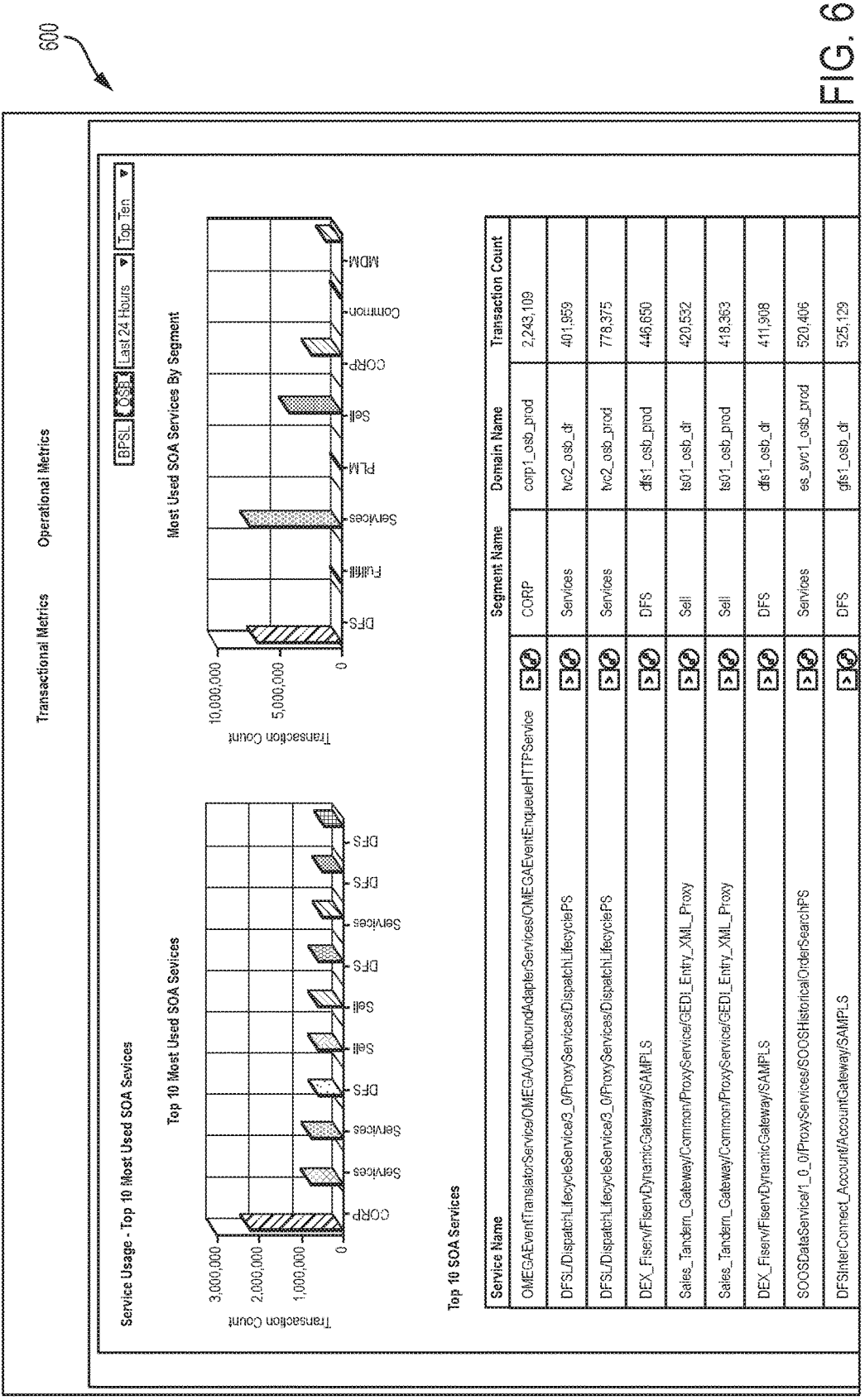

FIG. 6 illustrates an example dashboard 600. The dashboard 600 illustrates top ten services by transaction count, or number of calls, over the set of services on which the dashboard 500 of FIG. 5 is based. In certain embodiments, the dashboard 600 can serve as the basis for a request for caller-specific service-call data. For example, an administrator or other user can select a particular service on the dashboard 600 so as to trigger a process similar to the process 400 of FIG. 4 and generate a new report or dashboard.

FIG. 7 illustrates an example dashboard 700. The dashboard 700 illustrates caller-specific service-call data for a particular service as identified by a URL. In certain embodiments, the dashboard 700 can result from selection of a corresponding service shown in the dashboard 600. Moreover, the dashboard 700 can result from executing a process similar to the process 400 of FIG. 4. In particular, the dashboard 700 illustrates transaction counts, or call counts, for particular host IP addresses, host names and application names.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a computer system:
   identifying a particular service of a service-oriented architecture, wherein the identifying the particular service yields an identifier of the particular service;
   querying a data store for callers of the particular service, wherein the querying yields load-balancing internet protocol (IP) addresses of the callers in relation to proportional numbers of calls to the particular service;
   resolving the load-balancing IP addresses to host IP addresses of the callers of the particular service;
   resolving the host IP addresses to host names of particular hosts;
   identifying applications of the particular hosts via the host names;
   generating a data object comprising the host names, identifiers of the applications, and information related to the proportional numbers of calls to the particular service; and
   identifying service utilization by the callers for the particular service based, at least in part, on the generated data object.

2. The method of claim 1, comprising:
   prior to the identifying the particular service, receiving a request for caller-specific service-call data; and
   wherein the identifying the particular service comprises determining one or more services that are covered by the request.

3. The method of claim 2, wherein the receiving the request comprises receiving a user indication of a particular service on a user dashboard.

4. The method of claim 2, comprising:
   generating information responsive to the request via the data object; and
   publishing the information to a user dashboard.

5. The method of claim 2, wherein:
   the request is constrained by a particular time period; and
   the querying the data store comprises querying the data store for callers of the particular service during the particular time period.

6. The method of claim 1, comprising:
identifying a plurality of services of the service-oriented architecture, wherein the identifying the plurality of services yields service-specific identifiers of the plurality of services; and
for each service of the plurality of services:
via the service-specific identifiers, querying the data store for a data set comprising one or more load-balancing IP addresses in relation to proportional numbers of calls to the service;
resolving the one or more load-balancing IP addresses to one or more host IP addresses;
resolving the one or more host IP addresses to one or more host names of one or more particular hosts;
identifying one or more applications of the one or more particular hosts via the host names; and
generating an object comprising the one or more host names, identifiers of the one or more applications, and information related to the proportional numbers of calls to the service.

7. The method of claim 1, wherein the identifier of the particular service comprises a uniform resource locator.

8. An information handling system comprising a processor and memory, wherein the processor in combination with the memory are operable to implement a method comprising:
identifying a particular service of a service-oriented architecture, wherein the identifying the particular service yields an identifier of the particular service;
via the identifier, querying a data store for callers of the particular service, wherein the querying yields load-balancing internet protocol (IP) addresses of the callers in relation to proportional numbers of calls to the particular service;
resolving the load-balancing IP addresses to host IP addresses of the callers of the particular service;
resolving the host IP addresses to host names of particular hosts;
identifying applications of the particular hosts via the host names;
generating a data object comprising the host names, identifiers of the applications, and information related to the proportional numbers of calls to the particular service; and
identifying service utilization by the callers for the particular service based, at least in part, on the generated data object.

9. The information handling system of claim 8, the method comprising:
prior to the identifying the particular service, receiving a request for caller-specific service-call data; and
wherein the identifying the particular service comprises determining one or more services that are covered by the request.

10. The information handling system of claim 9, wherein the receiving the request comprises receiving a user indication of a particular service on a user dashboard.

11. The information handling system of claim 9, the method comprising:
generating information responsive to the request via the data object; and
publishing the information to a user dashboard.

12. The information handling system of claim 9, wherein:
the request is constrained by a particular time period; and
the querying the data store comprises querying the data store for callers of the particular service during the particular time period.

13. The information handling system of claim 8, the method comprising:
identifying a plurality of services of the service-oriented architecture, wherein the identifying the plurality of services yields service-specific identifiers of the plurality of services; and
for each service of the plurality of services:
via the service-specific identifiers, querying the data store for a data set comprising one or more load-balancing IP addresses in relation to proportional numbers of calls to the service;
resolving the one or more load-balancing IP addresses to one or more host IP addresses;
resolving the one or more host IP addresses to one or more host names of one or more particular hosts;
identifying one or more applications of the one or more particular hosts via the host names; and
generating an object comprising the one or more host names, identifiers of the one or more applications, and information related to the proportional numbers of calls to the service.

14. The information handling system of claim 8, wherein the identifier of the particular service comprises a uniform resource locator.

15. A computer-program product comprising a non-transitory computer-usable medium having computer-readable program code embodied therein, the computer-readable program code adapted to be executed to implement a method comprising:
identifying a particular service of a service-oriented architecture, wherein the identifying the particular service yields an identifier of the particular service;
via the identifier, querying a data store for callers of the particular service, wherein the querying yields load-balancing internet protocol (IP) addresses of the callers in relation to proportional numbers of calls to the particular service;
resolving the load-balancing IP addresses to host IP addresses of the callers of the particular service;
resolving the host IP addresses to host names of particular hosts;
identifying applications of the particular hosts via the host names;
generating a data object comprising the host names, identifiers of the applications, and information related to the proportional numbers of calls to the particular service; and
identifying service utilization by the callers for the particular service based, at least in part, on the generated data object.

16. The computer-program product of claim 15, the method comprising:
prior to the identifying the particular service, receiving a request for caller-specific service-call data; and
wherein the identifying the particular service comprises determining one or more services that are covered by the request.

17. The computer-program product of claim 16, wherein the receiving the request comprises receiving a user indication of a particular service on a user dashboard.

18. The computer-program product of claim 16, the method comprising:
generating information responsive to the request via the data object; and
publishing the information to a user dashboard.

19. The computer-program product of claim 16, wherein:
the request is constrained by a particular time period; and the querying the data store comprises querying the data store for callers of the particular service during the particular time period.

20. The computer-program product of claim 15, the method comprising:
   identifying a plurality of services of the service-oriented architecture, wherein the identifying the plurality of services yields service-specific identifiers of the plurality of services;
   for each service of the plurality of services:
      via the service-specific identifiers, querying the data store for a data set comprising one or more load-balancing IP addresses in relation to proportional numbers of calls to the service;
      resolving the one or more load-balancing IP addresses to one or more host IP addresses;
      resolving the one or more host IP addresses to one or more host names of one or more particular hosts;
      identifying one or more applications of the one or more particular hosts via the host names; and
      generating an object comprising the one or more host names, identifiers of the one or more applications, and information related to the proportional numbers of calls to the service.

* * * * *